UNITED STATES PATENT OFFICE.

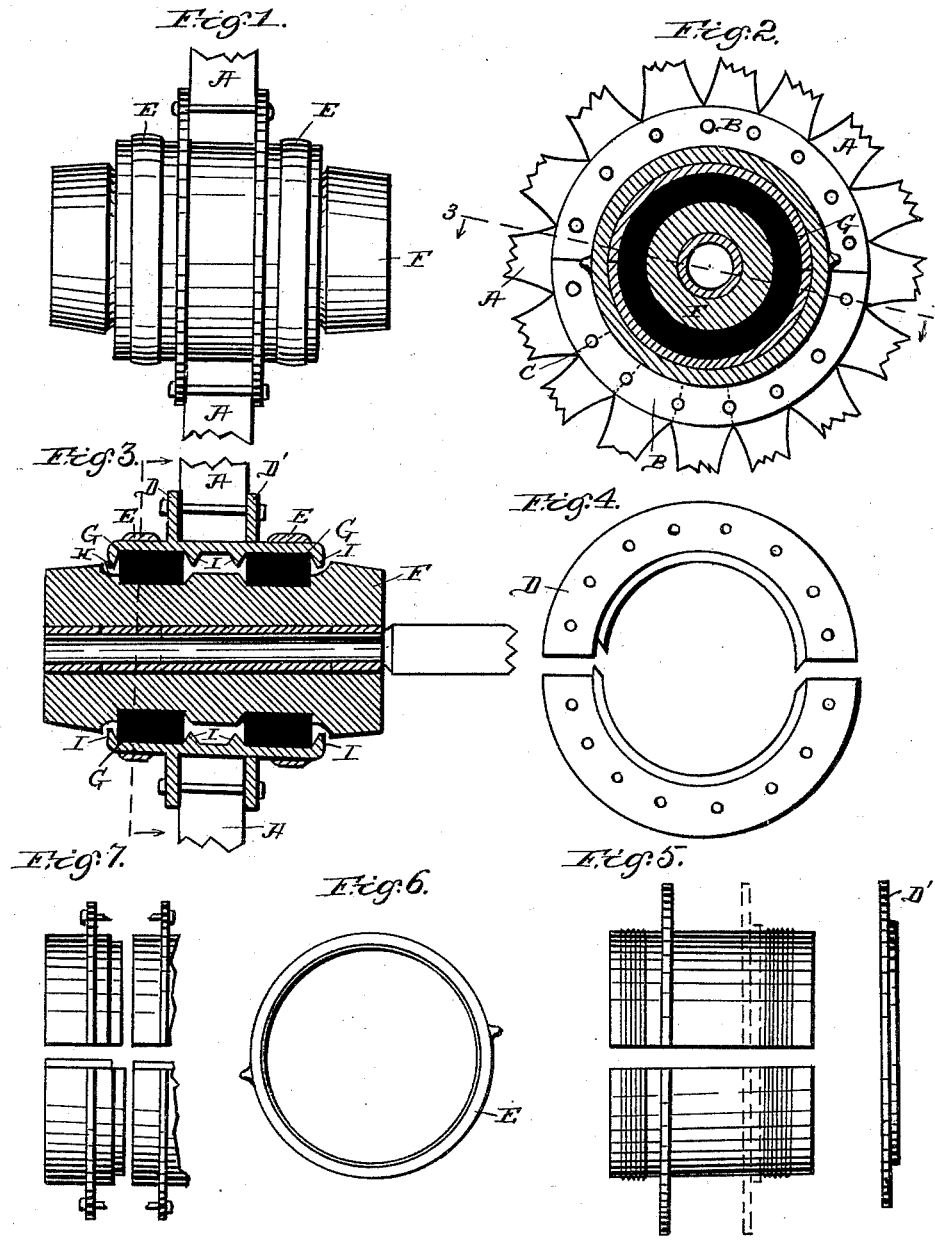
(No Model.)
J. McLACHLAN.
VEHICLE WHEEL.
No. 436,374. Patented Sept. 16, 1890.

JOHN McLACHLAN, OF CHICAGO, ILLINOIS, ASSIGNOR OF ONE-HALF TO ADDISON J. TRUNKEY, OF SAME PLACE, IDA J. TRUNKEY ADMINISTRATRIX OF SAID ADDISON J. TRUNKEY, DECEASED; SAID ADMINISTRATRIX ASSIGNOR OF ONE-HALF TO HERSELF.

VEHICLE-WHEEL.

SPECIFICATION forming part of Letters Patent No. 436,374, dated September 16, 1890.

Application filed March 11, 1890. Serial No. 343,488. (No model.)

*To all whom it may concern:*

Be it known that I, JOHN McLACHLAN, a subject of the Queen of Great Britain, and a resident of Chicago, in the county of Cook and State of Illinois, have invented certain new and useful Improvements in Vehicle-Wheels, of which the following is a specification.

This invention relates to improvements in that class of vehicle-wheels in which heretofore the spokes have been individually yieldingly connected with the hub in such manner that the spokes and rim of the wheel were capable of yielding or moving independent of the hub. This construction has proven objectionable, because of the dangerous weakening of the wheel necessarily resulting therefrom, and the consequent liability of the "dishing" or collapsing of the wheel, and also because of the general looseness and instability of such a construction, because the spokes would soon become loose and rattle, besides offering such unequal support to the rim as to constantly rack the same.

The prime object of this invention is to have a yielding connection between the wheel and axle of a vehicle, whereby is avoided the weakening of the strength of the wheel, and also the racking and wear thereof, due to the uneven support of any portion thereof.

Another object of this invention is to have this yielding connection between the wheel and axle without reducing the rigidity of the wheel as a whole.

Other objects are to simplify the construction and promote the durability of the wheel, and to provide certain details in the carrying out of my invention, all as illustrated in the accompanying drawings, in which—

Figure 1 represents a side elevation of the hub and a portion of the spokes of a vehicle-wheel embodying my invention; Fig. 2, a vertical section thereof on the line 2 2 of Fig. 3, looking in the direction indicated by the arrows; Fig. 3, a horizontal section on the line 3 3 of Fig. 2; Fig. 4, a detail end elevation of the sectional spoke-ring, showing the parts slightly separated; Fig. 5, a detail side view of the same; Fig. 6, a detail view of the binding-ring or screw-band for the spoke-ring, and Fig. 7 a side elevation in detail of a modified form of spoke-ring.

Similar letters of reference indicate the same parts in the several figures of the drawings.

Referring by letter to the accompanying drawings, A indicates the spokes of the wheel, and B the spoke-rings, to which the inner ends of the spokes may be secured in any well-known and convenient manner, such as by the bolts C passing through the annular flanges D D' upon the ring between each pair of spokes, although this arrangement is not arbitrary. This spoke-ring is preferably composed of two sections, with brake-joints united together by means of binding-rings or screw-bands E, screwed onto each end of the ring. Upon each section of the ring is cast a half annular flange which when put together forms the annular flange D for securing the spokes to the ring, while the remaining flange D' is preferably made in the form of a collar, and sleeved upon the ring for greater convenience in tightening the spokes in position. Within the ring works the hub proper F of the wheel in which the axle bears, between which and the ring is inserted one or more elastic rings or cushions G, composed of india-rubber or any other suitable yielding substance, which cushions fit snugly between the hub and ring, so as to maintain the latter in a substantially central position within the ring at all times, except when under considerable pressure, it being intended that the hub and wheel shall revolve in unison and upon a common axis under ordinary conditions. This cushion, whether composed of one or more rings or sections, may best be held in position by being confined in an annular groove or grooves H in the hub and between annular flanges I' upon the ring.

From the foregoing it will be understood that when the hub is sleeved upon the axle of the vehicle it has no movement independent thereof, excepting its rotary movement in unison with the wheel, and that in effect it amounts to simply nothing more or less than a sleeve upon the axle, and that the spoke-ring is in effect the hub of the wheel, being rigidly connected with the spokes and being capable of both vertical and lateral movement independent of the axle and hub proper, so that by my construction the wheel is really capable of yielding both vertically and laterally relative to the axle, the yielding connection formed by the elastic cushions being between the wheel and axle, and not between the spokes of the wheel and the hub, as in the prior construction referred to.

By the employment of my invention the wheel, while capable of yielding relative to the axle, is still as rigid as any ordinary wheel without the yielding function, and the strength thereof is not therefore reduced by the yielding connection, as has heretofore been the case.

I do not desire to limit myself to the specific construction herein shown and described, for this may vary considerably without departing from the spirit of my invention, especially with relation to the employment of the hub, which may obviously be dispensed with, except for economical reasons, and also the construction of the spoke-ring, which may have any other desirable form, either that of a continuous ring or of the sectional ring previously described, or the sectional ring illustrated in Fig. 7, in which the ring is shown as formed in four sections instead of two, being divided transversely as well as longitudinally.

Having described my invention, what I claim, and desire to secure by Letters Patent, is—

1. In a vehicle-wheel, the combination, with the spoke-ring and spokes secured rigidly thereto, of the hub located within said ring, and an elastic cushion interposed between and next said hub and ring, substantially as described.

2. In a vehicle-wheel, the combination, with the sectional spoke-ring and spokes secured rigidly thereto, of the hub located within said ring, and an elastic cushion interposed between and next said hub and ring, substantially as described.

3. In a vehicle-wheel, the combination, with the sectional spoke-ring, half annular flanges thereon to which the spokes are secured, and binding-rings for uniting said sections of the hub located within said ring, and an elastic cushion interposed between said hub and ring, substantially as described.

JOHN McLACHLAN.

Witnesses:
R. C. OMOHUNDRO,
JNO. G. ELLIOTT.